US007472920B2

(12) United States Patent
Chai

(10) Patent No.: US 7,472,920 B2
(45) Date of Patent: Jan. 6, 2009

(54) RETRACTABLE BED MECHANISM

(76) Inventor: Chang-Wei Chai, 235 Chung-Ho Box 8-24, Taipei, Nantou Hsien (TW)

( * ) Notice: Subject to any disclaimer, the term of this patent is extended or adjusted under 35 U.S.C. 154(b) by 385 days.

(21) Appl. No.: 11/337,841

(22) Filed: Jan. 23, 2006

(65) Prior Publication Data

US 2007/0169270 A1 Jul. 26, 2007

(51) Int. Cl.
*B62B 3/00* (2006.01)

(52) U.S. Cl. ....................... 280/643; 280/639; 280/648; 280/638; 280/43; 280/47.34; 280/47.4; 280/47.41; 280/304.1; 280/657

(58) Field of Classification Search ................. 280/643, 280/639, 648, 638, 43, 47.34, 47.4, 47.41, 280/304.1, 657; 297/DIG. 4
See application file for complete search history.

(56) References Cited

U.S. PATENT DOCUMENTS 252,431 A * 1/1882 Collignon ................... 280/643
1,591,529 A * 7/1926 Guerber ...................... 280/47.4
4,079,990 A * 3/1978 McMunn et al. .............. 297/69
4,390,076 A * 6/1983 Wier et al. ..................... 180/11
5,366,036 A * 11/1994 Perry ........................ 180/65.1
5,556,121 A * 9/1996 Pillot ...................... 280/304.1
5,772,226 A * 6/1998 Bobichon ................ 280/250.1
5,865,457 A * 2/1999 Knabusch et al. ........ 280/304.1
6,192,533 B1 * 2/2001 Porcheron ..................... 5/86.1
6,565,112 B2 * 5/2003 Hanson et al. .............. 280/650
6,601,869 B2 * 8/2003 Porcheron ................... 280/648
6,976,698 B2 * 12/2005 Kuiken ...................... 280/647
2004/0173998 A1 * 9/2004 Meyer ........................ 280/657
2005/0116440 A1 * 6/2005 Bernatsky et al. ........ 280/250.1
2006/0012147 A1 * 1/2006 Laffin ...................... 280/304.1

* cited by examiner

*Primary Examiner*—Christopher P Ellis
*Assistant Examiner*—Jacob Meyer

(57) ABSTRACT

A retractable bed mechanism is disclosed. The bed mechanism comprises a sitting pad, a sitting back, a leg seat and a base seat interconnected by a plurality of linking rods and two driving means. The driving means drives the linking rods so as to drive the sitting pad, the sitting back and the leg seat so as to provide various sitting or laying or upright position to the user which facilitates face to face conversation or accessible to objects or other activities.

8 Claims, 7 Drawing Sheets

RETRACTABLE BED MECHANISM

BACKGROUND OF THE INVENTION (a) Technical Field of the Invention

The present invention relates to retractable bed mechanism, and in particular, to a bed mechanism which can provide the user in a sitting position, a laying position, or upright position to carry out an activity, and to promote the activity of the joints of the body and blood circulation.

(b) Description of the Prior Art

Convention wheelchair only allows a user to sit upright on the chair and provides only movement but does not provide a resting position or changing of sitting position to the user. As a result, hospitals need wheelchairs of various sizes and specification for patient of various sizes. This will increase the cost of operation of the hospital. Further, as the wheelchair has a fixed height, it does not provide an appropriate height for the user to access to an object.

Conventional beds for patient are generally of two retracting position i.e., laying position or sitting position. It is convenient for the bed to be adjusted in a sitting position. However, the bed structure is unlike a wheelchair which is moveable from one place to another. The users, due to prolong period in one fixed position, may have poor blood circulation and therefore, the joints or other parts of the body are impaired. Thus, the purpose of rehabitation of the user will not be achieved. In addition, the bed structure will not allow the user to access to an object. In view of the above, it is an object of the present invention to provide a retractable bed mechanism which can mitigate the above drawbacks.

SUMMARY OF THE INVENTION

The primary purpose of the present invention is to provide a retractable bed mechanism which facilitates conversation, accessible to objects, promote movement of joints of the body, and blood circulation. The bed mechanism can be adjusted in a laying position, upright position, or a sitting position.

A main object of the present invention is to provide a retractable bed mechanism comprising a base seat having an arch-shaped guiding slot with one end facing the front side of the base seat; a first driving means perpendicularly mounted to the base seat and having a first retractable rod which retracts upwards; a second driving means swing-mounted at the bottom end thereof to the base seat and having a second retractable rod which retracts upwards; a swinging rod having an upper end swing-mounted to the upper end of the first retractable rod and the bottom end thereof being extended to the arch-shaped guiding slot and moving along the arch-shaped guiding slot; a first bottom rod having the front end swing-mounted to the swinging rod; a second bottom rod having a rear end swing-mounted to the intersection between the swinging rod and the first bottom rod; a sitting pad having the front end swing-mounted to the upper end of the second retractable rod, and having a middle section being swing-mounted to the upper end of the first retractable rod; a back having the bottom end swing-mounted to the rear end of the first bottom rod, and having the bottom section being swing-mounted to the rear end of the sitting pad; and a leg seat having an upper end provided with a pivot section and the top and bottom position of the pivot section provided with a top pivot hole and a bottom pivot hole, wherein the top pivot hole is provided at the front end of the sitting pad, and the bottom pivot hole is provided at the front end of the second bottom rod.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
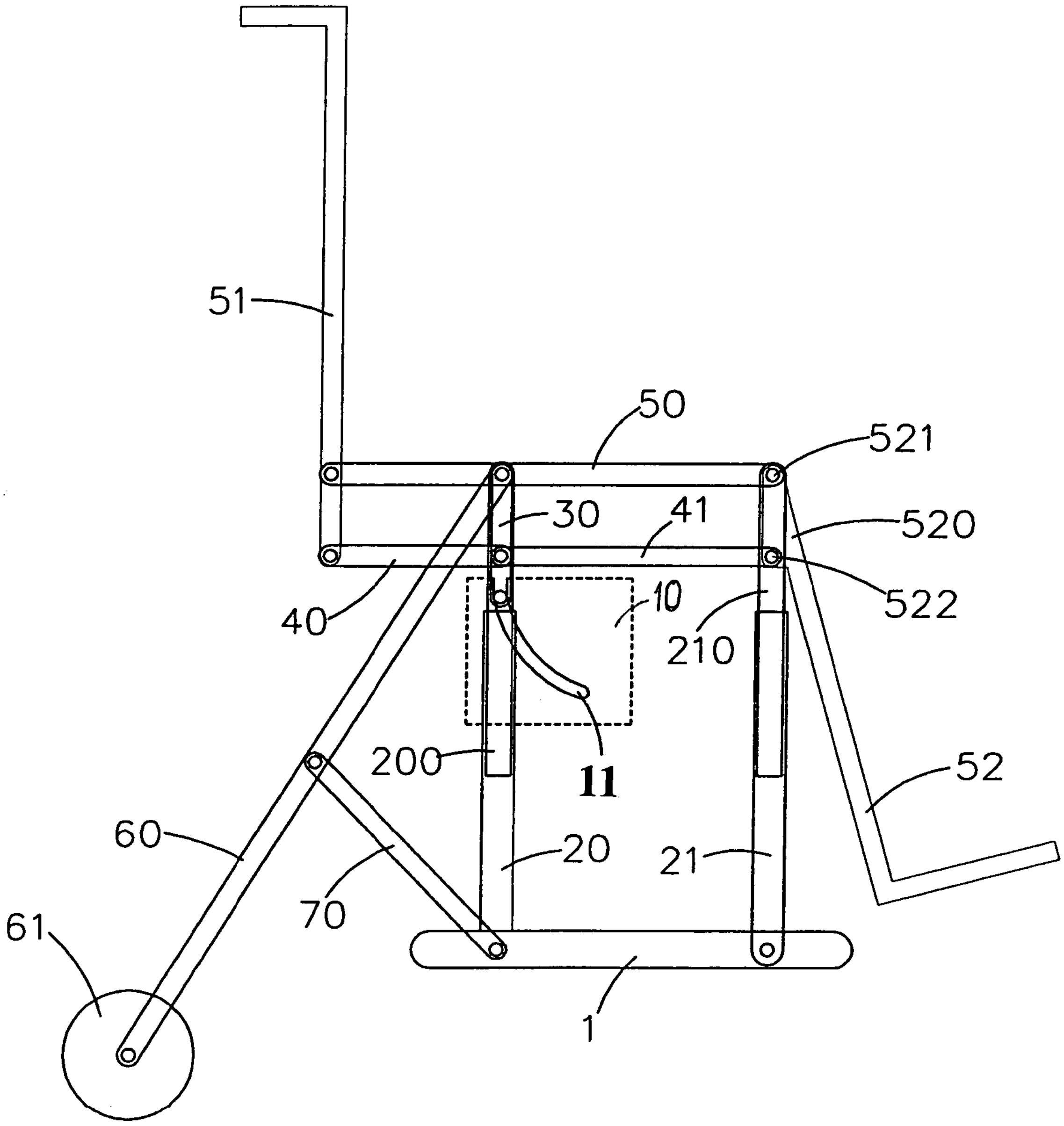
FIG. 1 is an upright sitting position in accordance with the present invention.

Referring to FIG. 1, there is shown a retractable bed mechanism comprising a base seat 10 having an arch-shaped guiding slot 11 with one end extended to a front side of the base seat 10, a first driving means 20 perpendicularly mounted to the base seat 10 and having a first retractable rod 200 which retracts upwards; a second driving means 21 swing-mounted at the bottom end thereof to the base seat 10 and having a second retractable rod 210 which retracts upwards; the first driving means 20 and the second driving means 21 are retained to a bar 1 at a lower side; a swinging rod 30 having an upper end swing-mounted to the upper end of the first retractable rod 200 and the bottom end thereof being extended to the arch-shaped guiding slot 11 and moving along the arch-shaped guiding slot 11, a first bottom rod 40 having the front end swing-mounted to the swinging rod 30, a second bottom rod 41 having a rear end swing-mounted to the intersection between the swinging rod 30 and the first bottom rod 40, a sitting pad 50 having the front end swing-mounted to the upper end of the second retractable rod 210, and having a middle section being swing-mounted to the upper end of the first retractable rod 200, a sitting back 51 having the bottom end swing-mounted to the rear end of the first bottom rod 40, and having the bottom section being swing-mounted to the rear end of the sitting pad 50, and a leg seat 52 having an upper end provided with a pivot section 520 and the top and bottom position of the pivot section 520 provided with a top pivot hole 521 and a bottom pivot hole 522, wherein the top pivot hole 521 is provided at the front end of the sitting pad 50, and the bottom pivot hole 520 is provided at the front end of the second bottom rod 41, a wheel rod 60 having one end provided with a pulley 61 which rotates and the other end swing-mounted to the upper end of the first retractable rod 200; and a support rod 70 having one end swing-mounted to the base seat 10 and the other end swing-mounted to the wheel rod 60.

Figure 2:
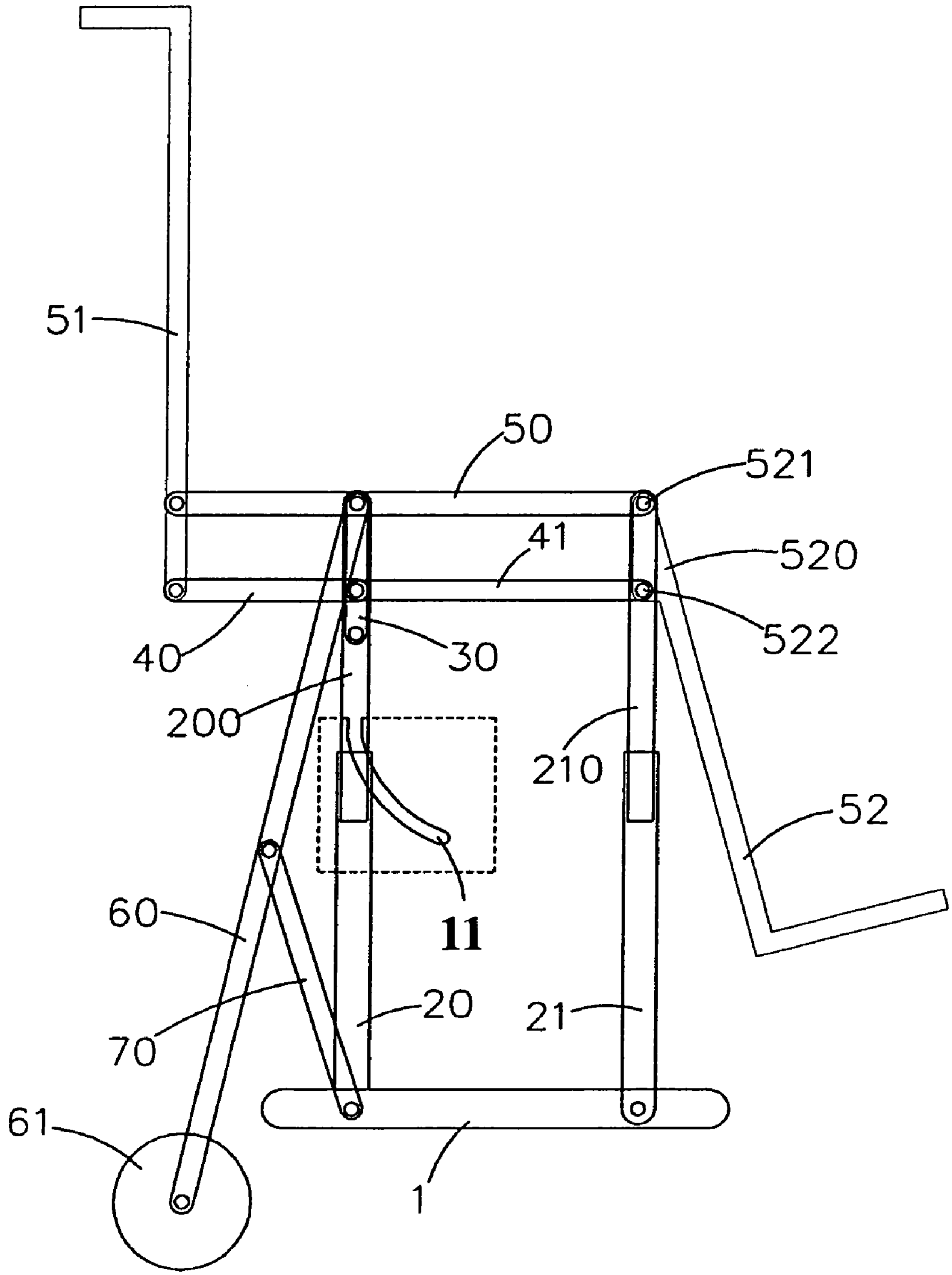
FIG. 2 is a schematic view showing elevation and lowering of the bed mechanism of the present invention.

As shown in FIG. 2, when the first driving means 20 and the second driving means 21 driving the first retractable rod 200 and the second retractable rod 210 are simultaneously and of same length, and the swinging rod 30 and the second retractable rod 200 are in parallel, then the first bottom rod 40 and the second bottom rod 40 are in a straight line, and the sitting pad 50 and the first bottom rod 40 are in parallel. Thus, the user sitting on the sitting pad 50 can elevate or lower then sitting pad 50.

Figure 3:
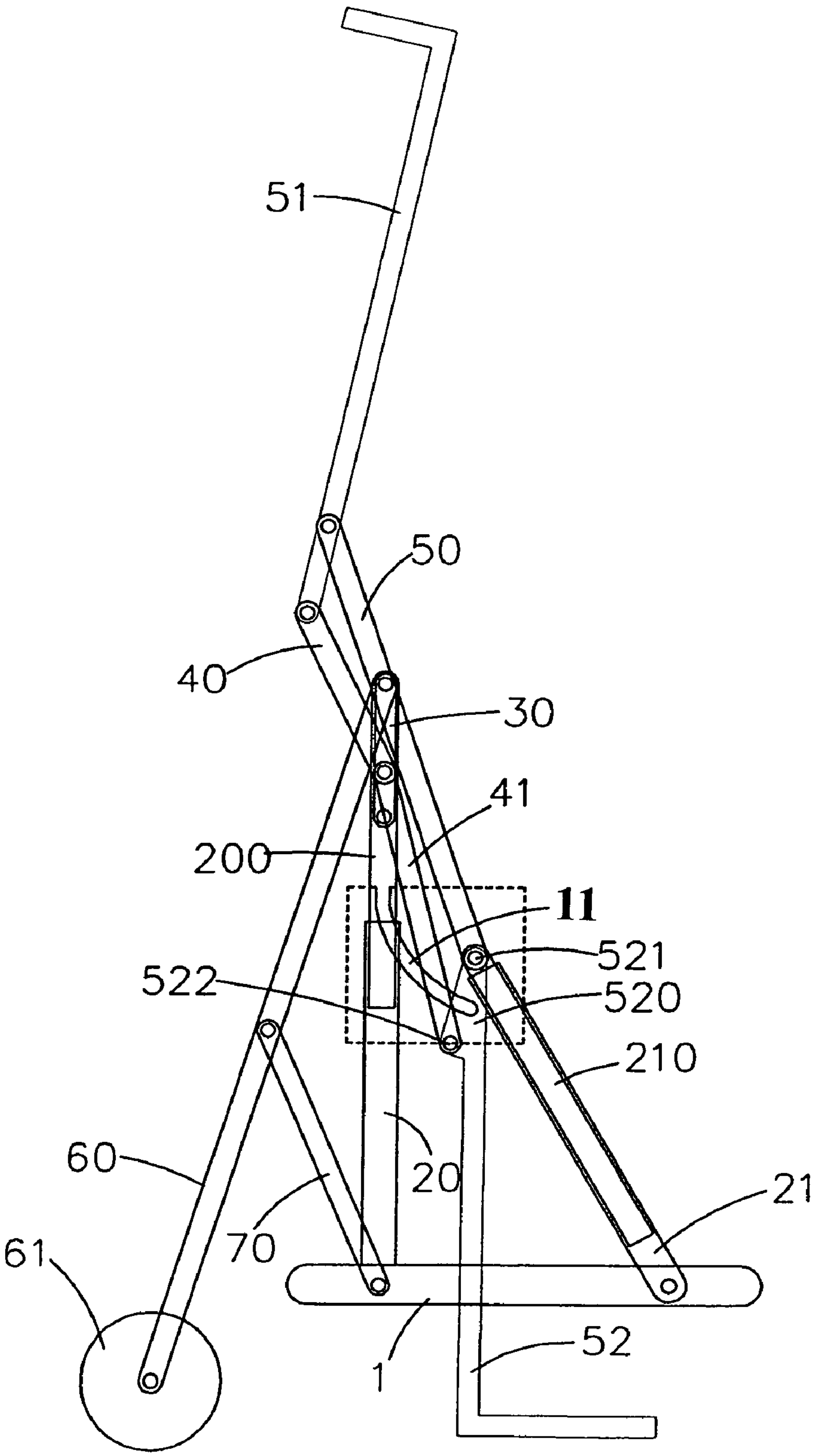
FIG. 3 is a schematic view showing the upright position of the present invention.

Referring to FIG. 3, when the first retraction rod 200 of the first driving means 20 is extended, the second retraction rod 210 of the second driving means 21 is retracted. The front end of the sitting pad 50 will tilt downward to interlink the second driving means 21 to swing backward. The leg sit 52 will be subjected to the pulling of the second base rod 41 and move downward vertically, and at the same time, the sitting back 51 will be urged by the first bottom rod 40 to move upward. Thus, the entire bed mechanism is in an upright position.

Figure 4:
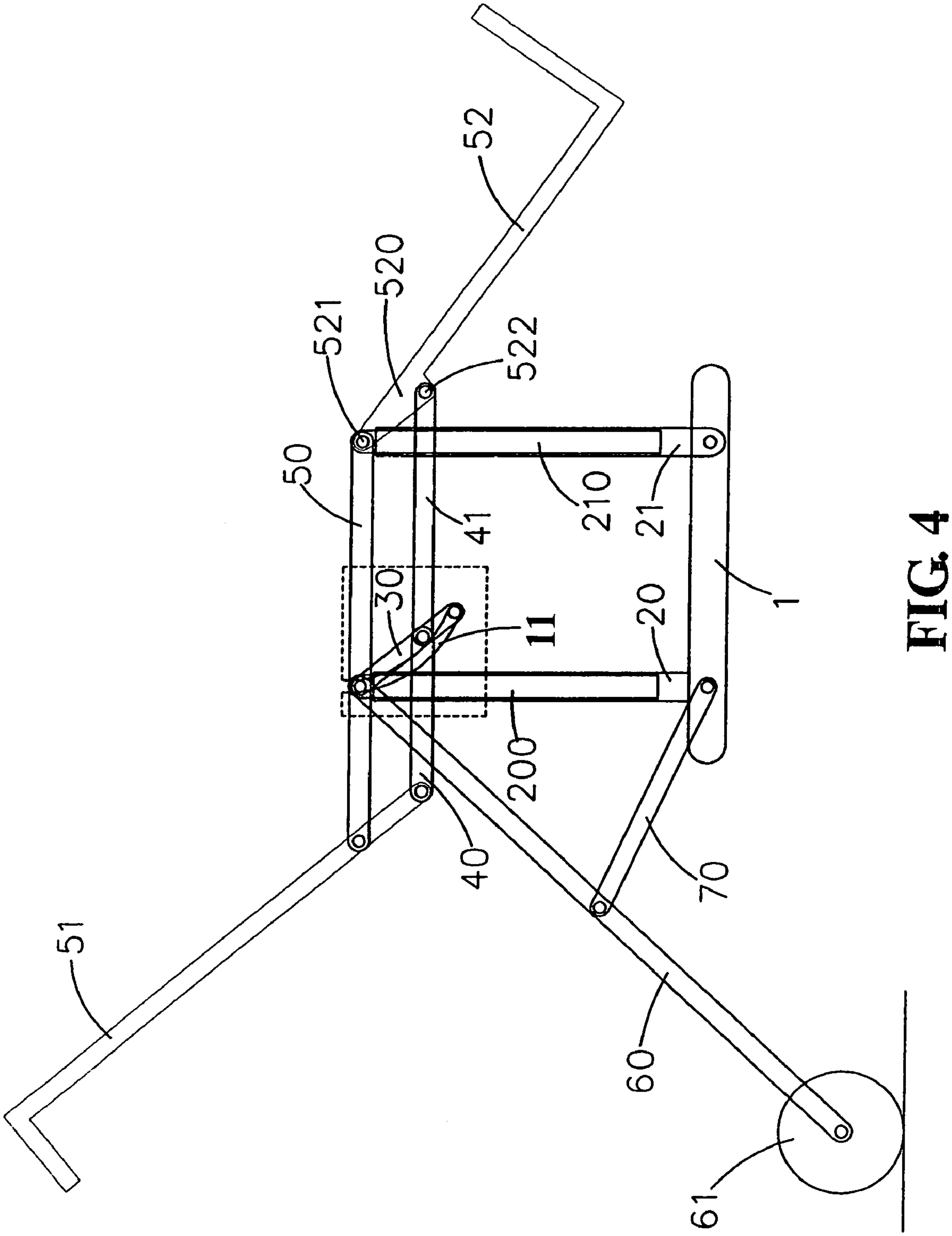
FIG. 4 is a schematic view showing the laying position of the present invention.

Referring to FIG. 4, when the first retraction rod 200 and the second retraction rod 210 are simultaneously retracted, the lower end of the swinging rod 30 will swing along the arch-shaped guiding slot 11 to move forward. Thus, the first bottom rod 40 and the second bottom rod 41 are moved forward horizontally such that the first bottom rod 40 pulls the bottom end of the sitting back 51 and the top end of the sitting back 51 moves backward to a laying position. At the same time, the second bottom rod 41 drives the leg seat 52 from the bottom pivot whole 522 such that the bottom end of the leg seat 52 will swing upward to an angle. Thus, the entire structure is in a laying position.

As shown in FIG. 4, when the bed structure is at a laying position, the pulley 61 will be driven by the wheel rod 60 and the support rod 70 and slide-support at the ground so as to form into a safety mechanism to prevent backward tilting.

Figure 5:
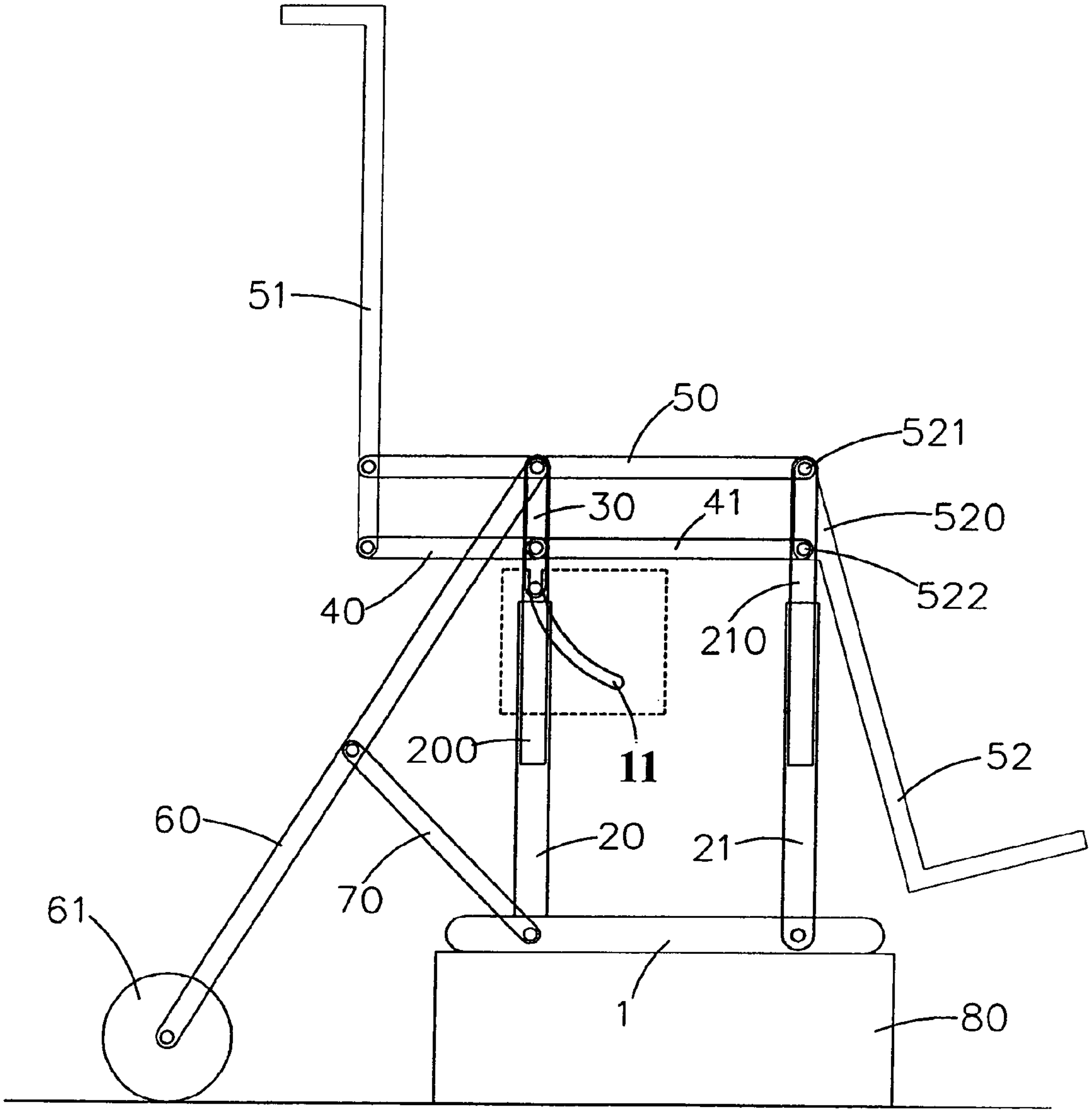
FIG. 5 is a schematic view showing the base seat connected to a holding seat of the present invention.
Figure 6:
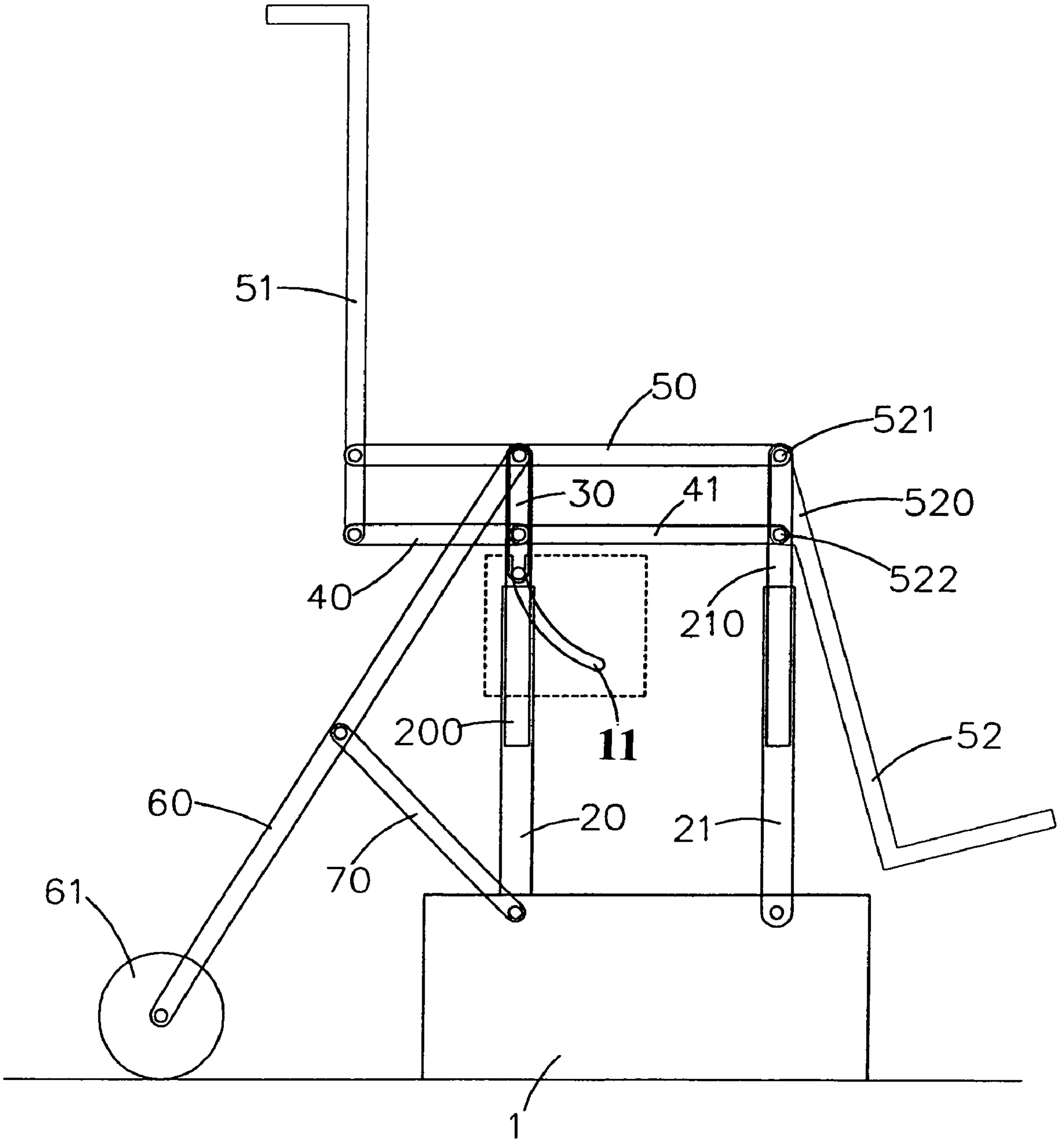
FIG. 6 is an implementation view of the base seat with an appropriate height in accordance with the present invention.
Figure 7:
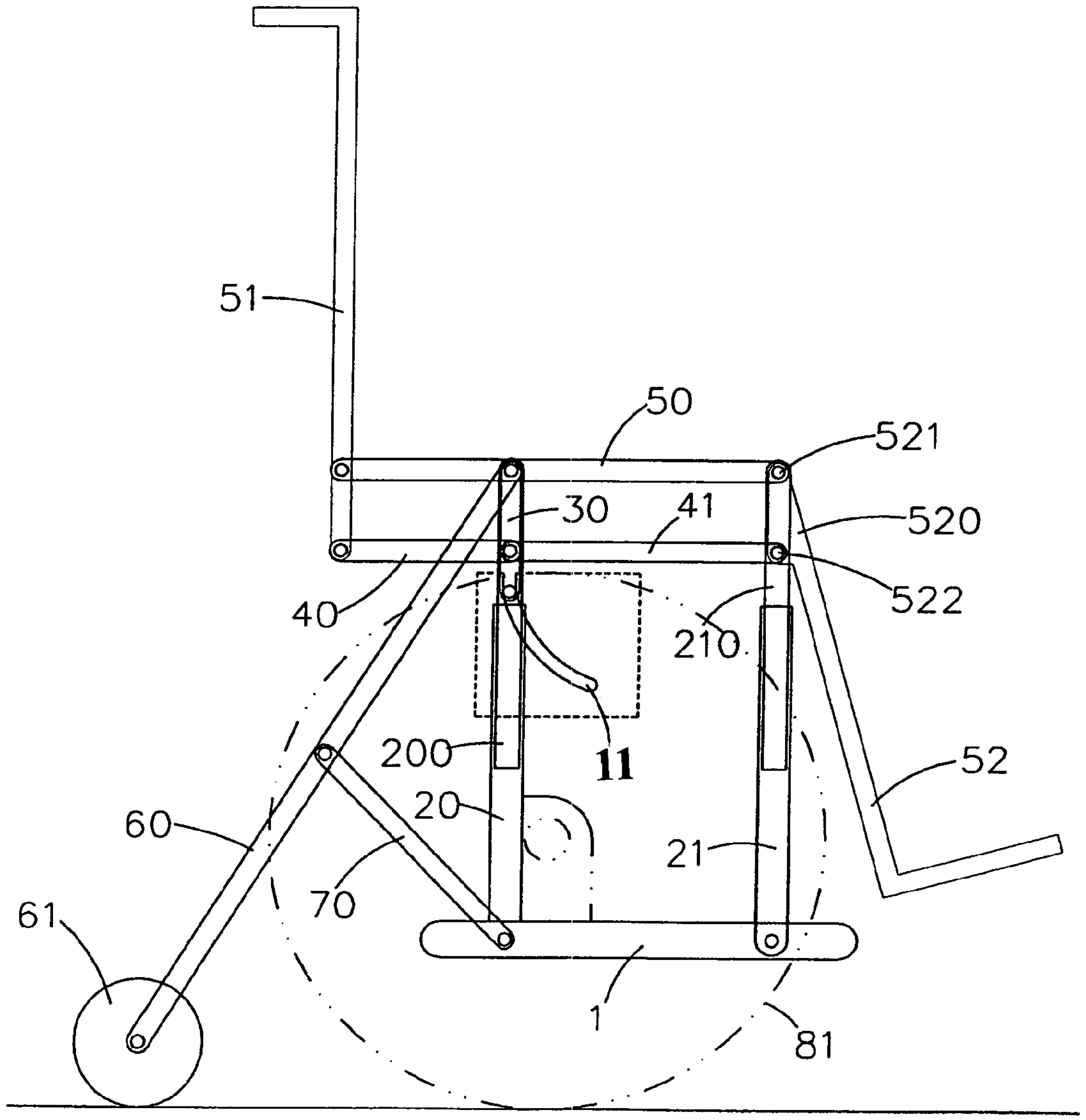
FIG. 7 is a schematic view showing the mounting of wheels to the bed mechanism of the present invention.

Referring to FIG. 5, the base seat 10 is secured to a holding seat 80 to use as a fixed type of rehabitation seat. As shown in FIG. 6, the base seat 10 is provided with an appropriate height for securing on the ground as a fixed type of rehabitation seat. As shown in FIG. 7, the base seat 10 is provided with wheels 81 for use as wheelchair.

In view of the above, there are four sections of movement of the retractable bed mechanism by means of driving the first driving means 20 and the second driving means 21, wherein:

The first section: When the first retraction rod 200 and the second retraction rod 210 are simultaneously retracted at the length of the middle section, i.e., the normal sitting position, it allows the user to have conversation with a person in a sitting position.

The second section: When the first retraction rod 200 and the second retraction rod 210 are fully extended out from the middle section to the full extended position, or from the full extended position to the middle section length, i.e., lowering elevation position, the user can access to objects placed on a higher position.

The third section: When the first retraction rod 200 and the second retraction rod 210 are simultaneously retracted from the middle section length, that is the length position, the user is allowed to rest by laying on the bed.

The forth section: When the first retraction rod 200 is fully extended out, and the second retraction rod 210 is fully retracted in, that is at the upright position, the pressure at the back and buttock section of the user are reduced so as to avoid unsmooth flowing of blood.

If the first section, the third section or the first section and the forth section or the third section, the third section and the forth section are repeated, the waist joint and the knee joints are provided with appropriate exercise, which enables rehabitation of the patient.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A retractable bed mechanism comprising a base seat having an arch-shaped guiding slot with one upper end extended to a front side of the base seat;

a first driving means perpendicularly mounted to the base seat and having a first retractable rod which retracts upwards;

a second driving means swing-mounted at a bottom end thereof to the base seat and having a second retractable rod which retracts upwards;

a swinging rod having an upper end swing-mounted to an upper end of the first retractable rod and a bottom end thereof being extended to the arch-shaped guiding slot and moving along the arch-shaped guiding slot;

a first bottom rod having a front end swing-mounted to the swinging rod;

a second bottom rod having a rear end swing-mounted to an intersection between the swinging rod and the first bottom rod;

a sitting pad having a front end swing-mounted to an upper end of the second retractable rod, and having a middle section being swing-mounted to the upper end of the first retractable rod;

a back having a bottom end swing-mounted to a rear end of the first bottom rod, and having a bottom section being swing-mounted to a rear end of the sitting pad; and a leg seat having an upper end provided with a pivot section and a top and bottom position of the pivot section provided with a top pivot hole and a bottom pivot hole, wherein the top pivot hole is provided at the front end of the sitting pad, and the bottom pivot hole is provided at a front end of the second bottom rod.

2. The retractable bed mechanism of claim 1, further comprising a wheel rod having one end provided with a rotatable pulley and the other end swingingly mounted to the swinging rod; and a support rod having one end swingingly mounted to the base seat and the other end swingingly mounted to the wheel rod.

3. The retractable bed mechanism of claim 1, wherein the base seat is secured to a holding seat as a fixed seat used as a rehabitation chair.

4. The retractable bed mechanism of claim 2, wherein the base seat is secured to a holding seat as a fixed seat for rehabitation.

5. The retractable bed mechanism of claim 1, wherein the base seat has an appropriate height from the ground and is used as a rehabitation chair.

6. The retractable bed mechanism of claim 2, wherein the base seat has an appropriate height from the floor and is used a fixed type of rehabitation seat.

7. The retractable bed mechanism of claim 1, wherein the base seat is fitted with wheels for used as wheelchair.

8. The retractable bed mechanism of claim 2, wherein the base seat is fitted with wheels for used as wheelchair.

* * * * *